United States Patent [19]

Takahashi

[11] 4,304,144
[45] Dec. 8, 1981

[54] GEAR SHIFT MECHANISM FOR AUTOMOTIVE MULTI-SPEED TRANSMISSION

[75] Inventor: Kotei Takahashi, Tokyo, Japan

[73] Assignee: Nissan Motor Company, Limited, Yokohama, Japan

[21] Appl. No.: 8,964

[22] Filed: Feb. 2, 1979

[30] Foreign Application Priority Data

Feb. 6, 1978 [JP] Japan .................................. 53/11412

[51] Int. Cl.³ .......................... G05G 5/10; G05G 9/12
[52] U.S. Cl. ....................................... 74/475; 74/476; 74/477
[58] Field of Search .......................... 74/477, 476, 475

[56] References Cited

U.S. PATENT DOCUMENTS

| | | | |
|---|---|---|---|
| 999,850 | 8/1911 | Palmer | 74/477 X |
| 3,364,793 | 1/1968 | Eastwood | 74/477 X |
| 3,581,594 | 6/1971 | Longshore | 74/477 |
| 3,866,488 | 2/1975 | Nakata et al. | 74/477 X |
| 3,939,724 | 2/1976 | Takahashi | 74/476 |

*Primary Examiner*—Dave W. Arola

[57] ABSTRACT

A gear shift mechanism comprising a gear shift lever, a selector rod, at least two fork shafts providing respectively one forward speed and a reverse speed, the two fork shafts each having a recess receiving the selector rod, wherein each recess is defined by two side walls, the first wall of which on the leading side in the direction of axial movement of the corresponding fork shaft has a predetermined length and the second wall of which on the trailing side has a length smaller than the predetermined length.

6 Claims, 11 Drawing Figures

GEAR SHIFT MECHANISM FOR AUTOMOTIVE MULTI-SPEED TRANSMISSION

BACKGROUND OF THE INVENTION

This invention generally relates to manually operable gear shift mechanisms for automotive multi-speed transmissions and particularly to an improved arrangement for eliminating failure in manual gear shifting between one forward speed and a reverse speed.

Gear shifting in this type of transmission is usually accomplished with a floor-type gear shift lever. The shift lever is connected with a well known striking rod which is axially reciprocal and turnable in accordance with movement of the shift lever in two crossing directions. Integrally mounted on the striking rod is a shorter selector rod depending therefrom, below which a plurality of spaced, parallel fork shafts is arranged. The selector rod is pivotal with turning movement of the striking rod for selective engagement of the end piece thereof in one of recesses machined to the respective inner ends of the fork shafts. The selection of the recess depends on various angles through which the striking rod is turned. With a reciprocal movement of the striking rod, the fork shaft engaged with the selector rod is moved usually in opposite directions providing two different speeds.

Taking an example of a transmission with five forward and one reverse speeds, the end piece of the selector rod fits in one of three recesses respectively of three fork shafts. When the end piece is in the first recess, the corresponding fork shaft is axially moved in the opposite direction to selectively provide the first and second forward speeds. Similarly, the selector rod in the second recess allows the corresponding fork shaft to move between the third and fourth speeds. With the end piece received in the third recess, the movement of the third fork shaft in one direction provides the fifth forward speed, while the movement made by the same fork shaft in the opposite direction provides the reverse speed.

It sometimes occurs in this type of gear shift mechanisms that upon shifting from the fifth to the lower forward speed, the fork shaft will run beyond the neutral position toward the reverse position due to overshifting or other causes. This will result in grating of the gears and often in mechanical damages to the gearing.

In order to eliminate the aforementioned problem, one prior art example proposes to mount another separate fork shaft exclusively for the reverse speed. This shaft has its own recess in which the end piece of the selector rod is engaged. Thus, the reverse speed is reached only when the selector rod is further swung by a predetermined angle out of the third recess to be completely received in the fourth recess so that failure due to careless shift operation is nearly impossible. This however entails a heavier and more troublesome shift operation.

There is another known example which provides a stop mechanism limiting the movement of the fork shaft beyond the neutral position toward the reverse speed. In this example, the gear shift mechanism should further install a particularly designed position determining arrangement for providing two different positions of the selector rod in dependence on whether the fifth speed or the reverse speed has been selected. In the first shift position of the selector rod determined by the position determining mechanism, the fork shaft is moved to the fifth speed while being prevented from moving to the reverse speed by means of the stop mechanism. In the second position selected, the fork shaft is permitted to move to the reverse speed avoiding the stop mechanism. Although this prior art mechanism can achieve an easier gear shifting it is impractical that a complicated arrangement of position determining mechanism is additionally required.

OBJECTS AND BRIEF DESCRIPTION OF THE INVENTION

It is therefore a primary object of the invention to eliminate or alleviate the aforementioned drawbacks and shortcomings of some prior art mechanisms and to provide an improved gear shift mechanism which can effectively prevent a possible failure in gear shifting with a lighter and more comfortable operation and a simplified and economical construction.

Another object of the invention is to provide, an improved gear shift mechanism for a multi-speed transmission which comprises at least two fork shafts, one for the reverse speed and the other for one forward speed, and a selector rod, the end of which is selectively engageable with the recess formed in any of the fork shafts, wherein a minimum amount of pivotal movement of the selector rod enables selection between one forward speed and a reverse speed and the selected one of the fork shafts is movable to the desired position independently of the other non-selected.

According to the invention, these objects are primarily achieved by so machining side walls defining the recesses of the fork shafts that one side wall of each recess on the leading side in the direction of axial movement of the corresponding fork shaft has a predetermined longer length and another side wall of each recess on the trailing side in the same direction has a length smaller than the predetermined length of one side wall.

Other objects, features and advantages accompanying the present invention will be apparent from the following detailed explanation made in conjunction with the accompanying drawings.

DETAILED DESCRIPTION OF THE PRIOR ART AND THE INVENTION

FIGS. 1 to 5 illustrate a prior art gear shift mechanism with five forward and one reverse speeds which is designed to avoid faulty gear shifting from the fifth to reverse speed. The construction and operation of the prior art mechanism is generally reviewed in connection with the drawings. The floor type shift lever 10 is mounted on a console or any other convenient part of the vehicle (not shown) in a well-known manner and movable back and forth as well as toward right and left, as indicated respectively by arrows a and b in FIG. 1. The lower end of the shift lever 10 is connected with a striking rod 12 for its axial reciprocal and turning motion in accordance with shift lever movement in the two crossing directions.

Figure 1:
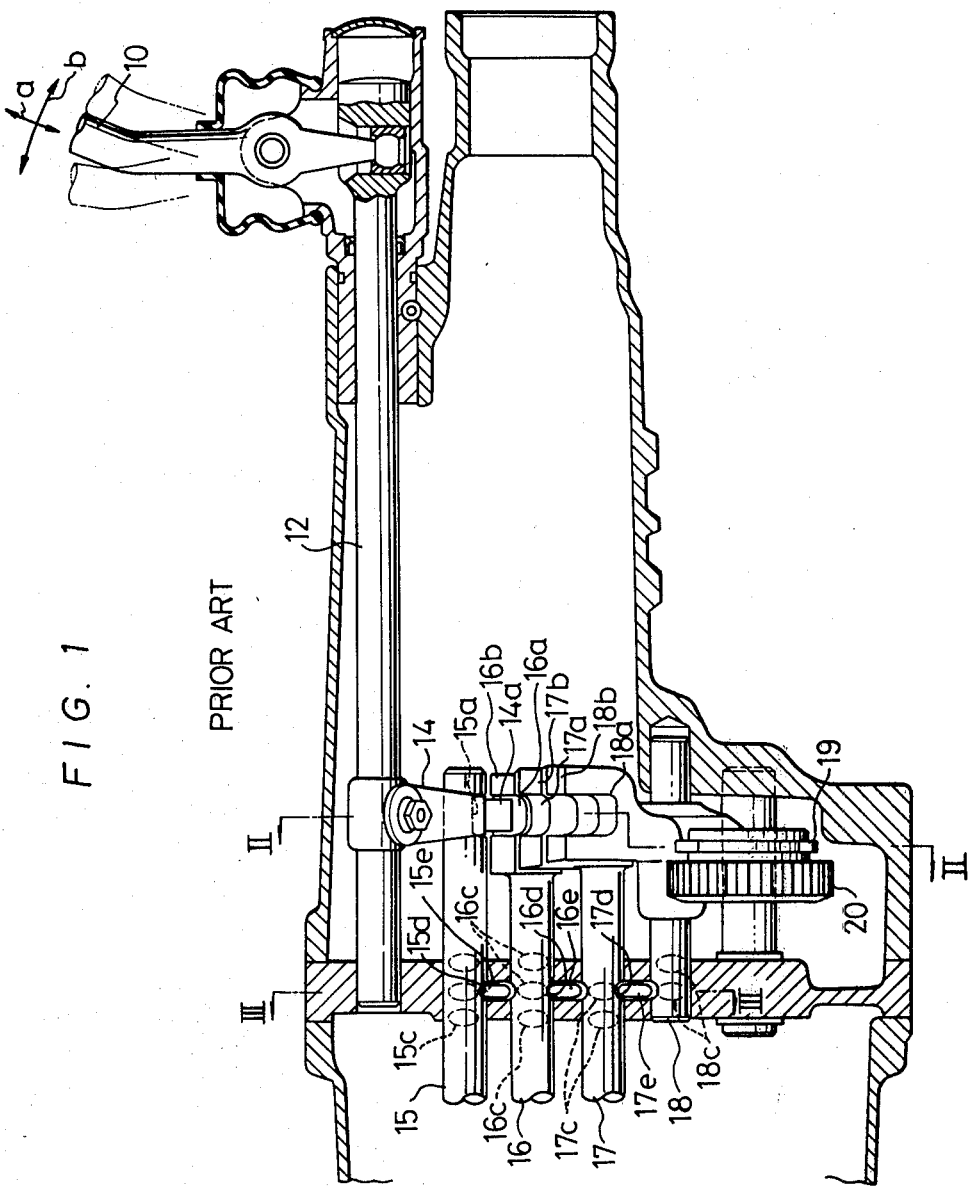
FIG. 1 is a schematic view in longitudinal section generally illustrating the prior art gear shift mechanism.
Figure 2:
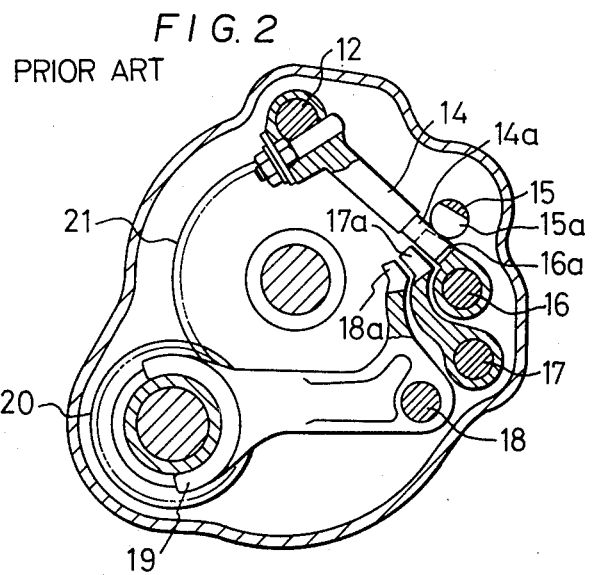
FIG. 2 is a section taken along the line II—II of FIG. 1.

Carried by the striking rod 12 is a selector rod 14 depending toward four fork shafts 15, 16, 17 and 18 which are arranged in parallel at some vertical and horizontal distances from one another as seen in FIG. 2. The fork shafts have at their inner ends formed respectively with generally U-shaped recesses 15a, 16a, 17a, 18a aligned in a direction of pivotal movement of the selector rod 14. One recess 15a of the topmost fork shaft 15 is machined directly to the fork shaft and the other three recesses 16a, 17a, 18a are machined to radial outward extensions 16b, 17b, 18b from the respective fork shafts.

The selector rod 14 has an integral end piece 14a of substantially rectangular shape which is selectively engageable in one of recesses 15a, 16a, 17a, 18a for axial movement of the corresponding fork shaft. In this example, four forward and one reverse speeds can be provided as hereinafter described.

When the end piece 14a, of the selector rod 14 engages in a downwardly opened recess 15a of the first one 15 of the fork shafts, the latter is axially movable with movement of the striking rod 12. In the drawing, the rightward movement of the fork shaft 15 from the neutral position provides the first forward speed at the non-illustrated transmission gearing, while the leftward movement provides the second forward speed. Likewise, the third and the fourth speeds are given respectively by rightward and leftward movements of the second fork shaft 16. The third fork shaft 17 is movable only in the rightward direction to provide the fifth forward speed.

By further turning the striking rod 12 and therefore pivoting the selector rod 14, the end piece 14a of the selector rod is then engaged in the recess 18a of the fourth fork shaft 18. The fork shaft 18 is then moved in leftward direction through axial movement of the striking rod 14 in the same direction. Thereupon, a shift fork 19 integral with the fork shaft 18 forces a reverse idler gear 20 into mesh with a reverse gear 21 (FIG. 2) in the well known manner, thus completing shifting to the reverse speed. As is apparent from FIGS. 1 and 2, the recesses are generally of the same U-shape with upwardly directed openings except for the recess 15a of the first shaft.

Figure 3:
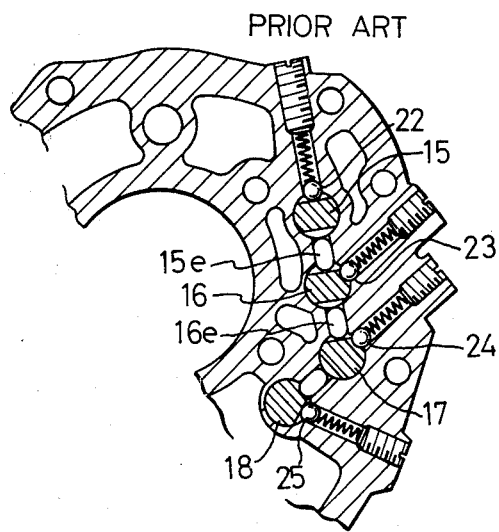
FIG. 3 is a section taken along the line III—III of FIG. 1.
Figure 4:
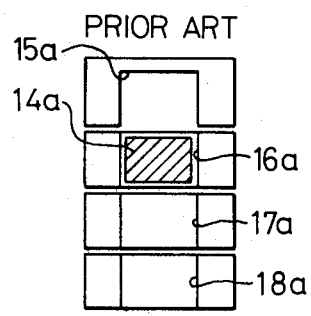
FIG. 4 is a developed view of recesses of the fork shafts according to the mechanism shown in FIG. 1.

On the peripheries of the fork shafts are formed elliptical grooves 15c, 16c, 17c, 18c, three for each of the first and second fork shafts 15, 16 and two for each of the third and fourth fork shafts 17, 18. As best seen in FIG. 3, spring-loaded check balls 22, 23, 24, 25 are provided for each fork shaft to fix it in the selected position through engagement of the ball with the corresponding elliptical grooves 15c, 16c, 17c, or 18c.

Figure 5:
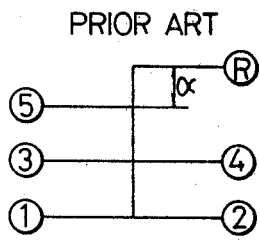
FIG. 5 is a diagram showing the shift pattern obtained by the mechanism shown in FIG. 1.
Figure 6:
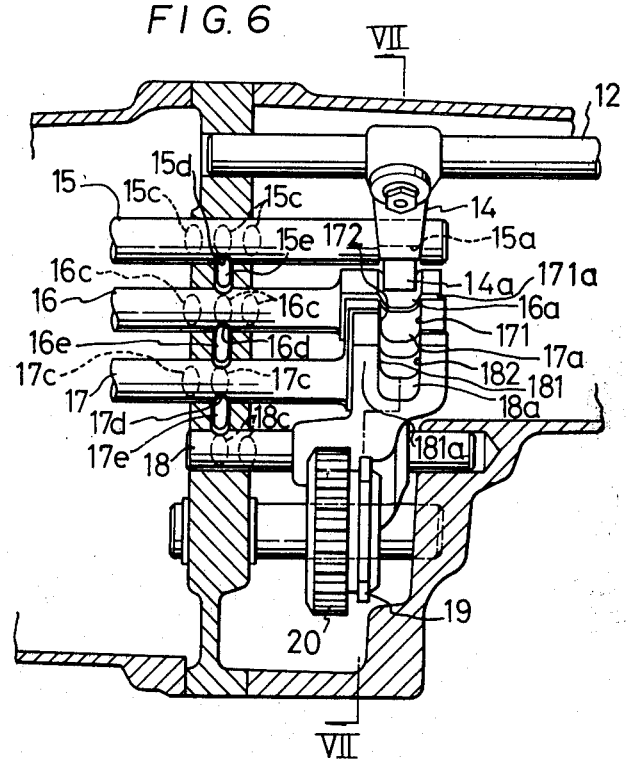
FIG. 6 is a schematic view in section showing a preferred embodiment of gear shift mechanism according to the invention.
Figure 7:
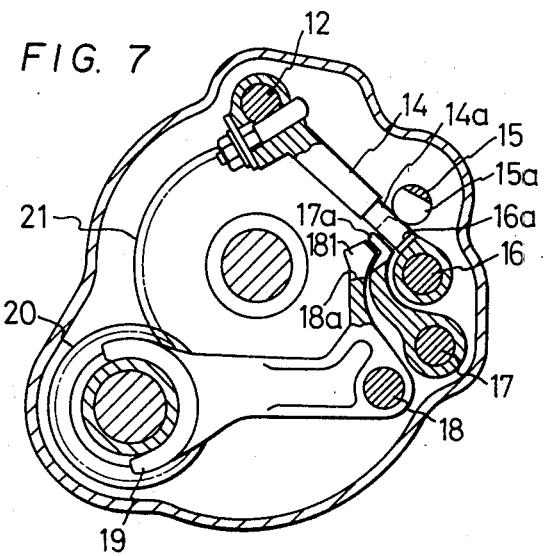
FIG. 7 is a section taken along the line VII—VII of FIG. 6.

Furthermore, an interlock mechanism known per se is provided which consists of circumferential grooves 15d, 16d, 17d, 18d and interlocking members 16e, 17e, 18e gripped between the two circumferential grooves of the adjoining fork shafts. The interlock mechanism operates in the known manner to prevent simultaneous movement of the two adjacent fork shafts. FIG. 5 represents the shift pattern obtained by the mechanism described above and illustrated in FIG. 1. It is evident that the fifth speed position is spaced in the direction of pivotal movement of the selector rod 14 from the reverse speed by a distance α. Accordingly, shifting to the reverse speed is accomplished only after complete engagement of the selector rod in the recess 18a of the fourth fork shaft; faulty shifting to the reverse speed is just unlikely in this example. However, as mentioned previously, most operators will have difficulty in shifting to the reverse as compared with the shift mechanism of the type in which the reverse speed and the fifth forward speed are obtained by rectilinear movement of one and the same fork shaft, because they have to move the shift lever by a relatively large amount in two crossing directions.

The preferred embodiment of the invention hereinafter described eliminates this drawback and provides an easier shift operation without sacrificing the effect of preventing faulty shifting.

In FIGS. 6 to 11 pertaining to the invention, like and corresponding parts carry the same numerals as in FIGS. 1 to 5 indicating the prior art. Also, the explanation concerning the common parts is omitted for brevity. It is a matter of course that the invention is applicable to any suitable type of shift mechanism other than the illustrated prior art example and the description of the invention in conjunction with this example is only for convenience of explanation. Also, the arrangement according to the invention is not limited to shifting between the fifth forward speed and the reverse speed but is effective in shifting between any other forward speed and the reverse speed if appropriate.

The number and arrangement of the fork shifts are like those of the illustrated prior art.

Figure 8:
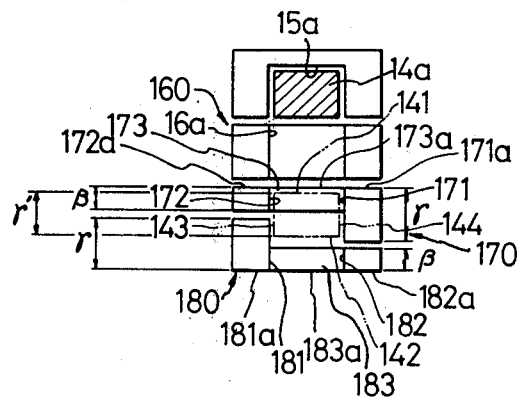
FIG. 8 is a view similar to FIG. 4 forming part of the embodiment shown in FIG. 6.

Each radial extension 16b, 17b, 18b (FIG. 1) of the three fork shafts is on its top provided with a selector rod receiving portion 160, 170, 180 (FIG. 8). Like the prior art described above, each selector rod receiving portion 170, 180 is constituted by a generally U-shaped recess 17a, 18a defined by two side walls 171, 172; 181, 182 and base walls 173, 183. It is also similar to the illustrated prior art that the end piece 14a of the selector rod is of a generally rectangular shape having a predetermined length γ' in the direction of pivotal movement of the selector rod.

According to the invention, the side walls of the recesses 17a and 18a of the two fork shafts 17 and 18 providing fifth forward and reverse speeds are particularly designed. The side wall 171 or 181 on the leading side of either fork shaft 17 or 18 has a length γ substantially equal to the predetermined length γ' of the end piece 14a as indicated in FIG. 8.

On the other hand, the side wall 172 or 182 on the trailing side of either shaft in the direction of its axial movement is of the shorter length β which is equal to the length of each recess 17a or 18a itself. The end surfaces 171a and 172a of the side walls 171, 172 and the outer surface 173a of the base wall 173 are aligned with one another so that the top plan view of the selector rod receiving portion 170 of the fork shaft 17 as a whole provides an L-shape as viewed in FIG. 8. Similarly, the selector rod receiving portion 180 of the fork shaft 18 is of the oppositely directed L-shape which is in registry with the L-shape of the fork shaft 17 to form a generally rectangular frame defining a rectangular central opening (no numeral).

The operation of the gear shift mechanism constructed as above is hereinafter described in detail. For shifting to the fifth speed, the end piece 14a of the selector rod is engaged in the recess 17a so that its one side wall 141 should be nearly aligned with the end faces 171a and 172a of the side walls 171 and 172 as indicated by a phantom line in FIG. 8. Rightward movement of the selector rod in the drawing then causes the fork shaft 17 to move in the same direction in the usual manner. If due to a mistake in the shifting operation, the selector rod 14 together with the striking rod 12 tends to move leftwardly, this movement of the selector rod is prevented by engagement of the end wall 143 of the end piece 14a with part of the longer side wall 181 of the fork shaft 18, since the latter is prevented from movement by the interlocking mechanism.

When shifting to reverse is desired, the selector rod is further swung in the same direction to engage its end piece 14a in the recess 18a of the fork shaft 18 so that its other side wall 142 should align with the end faces 181a and 18a. The fork shaft 18 is then moved leftwardly in the drawing with movement of the selector rod. Faulty movement of the fork shaft in the opposite direction never takes place for the same reason as explained in connection with the third shaft 17.

Figure 9:
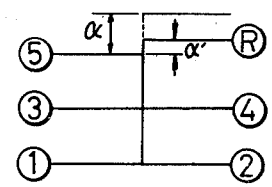
FIG. 9 is a diagram showing the shaft pattern obtained by the shift mechanism according the embodiment of FIG. 6.

The extent of movement made by the selector rod is thus limited to a minimum α' as seen in FIG. 9 which is smaller than the value α in the illustrated prior art example by (α−β). Thus, the operator can make gear shifting between the fifth and the reverse speeds with lighter and easier movement of the gear shift lever. The effect of preventing faulty operation is of course guaranteed as has been specified above.

Some subsidiary advantages accompany the arrangement of the invention. For instance, when the fork shaft 17 is moving to the fifth or reverse speed position with the selector rod 14 engaged in recess 17a the end piece 14a can at its side wall 142 abut against the inner end surface opposite to the outer end surface 182a through inappreciable angular movement of the selector rod, since the length γ' is generally equal to the length γ. Accordingly, slippage of the selector rod out of the recess 17a or hunting of the same in the direction of pivotal movement of the selector rod can be effectively avoided during gear shift operation. Also after completion of gear shifting, due to the stabilizing effect by the side wall 182, the selector rod is substantially free from influences by vibrations and oscillations transferred from the engine or the vehicle body.

Figure 10:
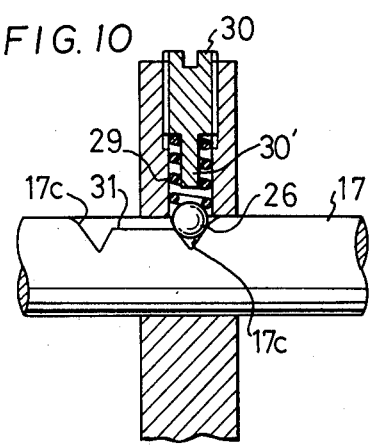
FIG. 10 is an enlarged view showing a partial modification made to the embodiment shown in FIG. 6.

FIG. 10 illustrates a modified example in which a stop mechanism in the form of a spring 29 loaded check ball 26 is replaced for the interlock mechanism. As shown, the check ball 26 is engageable in the two grooves 17c which may be identical with the peripheral grooves of the interlock mechanism. The two grooves in this example are interconnected by means of a shallow axial peripheral groove 31 so that the ball 26 is allowed to ride and roll upon the groove surface during rightward movement of the fork shaft 17 until it engages in another groove.

Located above the ball 26 is a fixed spring support 30, the downward extension 30' of which is spaced from the ball 26 at a certain distance. The distance is so determined that the ball should not abut the extension or abutment member 30' yet when the ball 26 slides on the shallow groove 31, while riding of the ball upon the peripheral surface of the fork shaft is prevented by abutment against the extension 30'. Rightward movement of the fork shaft 17 is thus prevented. The same mechanism is applied to fork shaft 18 to avoid leftward movement thereof. Hence, no simultaneous movement of the fork shaft takes place upon mistake in gear shifting.

Figure 11:
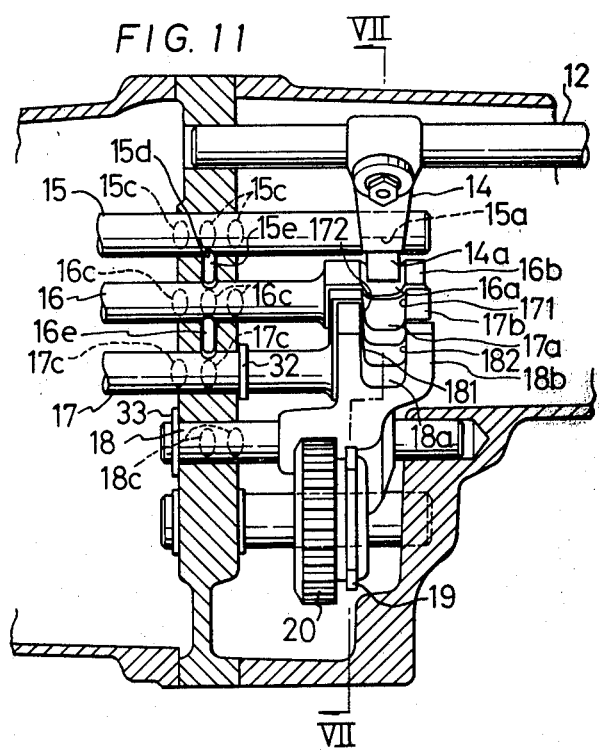
FIG. 11 is a view similar to FIG. 6 showing another partial modification made to the embodiment of FIG. 6.

Another example of stop mechanism is shown in FIG. 11. A snap ring 32 is fixedly mounted around the fork shaft 17 so that it abuts against the wall of a housing bore (no numeral) through which the fork shaft 17 is fittedly passed. Thus a leftward movement of the fork shaft 17 beyond the neutral position is prevented. Likewise, a snap ring 33 is positioned around the fork shaft 17 to prevent a rightward movement of the fork shaft 18. Sanp rings can be replaced by other suitable members such as stop pins or radial extensions from the fork shafts.

What is claimed is:

1. A gear shift mechanism for an automotive multispeed transmission comprising:
   a manually operable gear shift lever,
   a pivotally movable selector rod linked with the gear shift lever and having an end piece, said end piece having a predetermined length in the direction of pivotal movement of the selector rod,
   at least two axially movable parallel fork shafts including a first shaft movable in one direction for selecting one forward speed and a second shaft movable in the opposite direction for selecting one reverse speed, said fork shafts having respectively generally U-shaped recesses aligned in the direction of pivotal movement of the selector rod, the end piece of the selector rod being selectively engageable in one of the recesses in accordance with shifting operation of the gear shift lever for axial movement of the corresponding fork shaft,
   each said recesses being defined by two side walls and one base wall,
   a first side wall of each said recesses on the leading side in the direction of axial movement of the corresponding fork shaft having a predetermined length generally equal to the length of the end piece and a second side wall of each said recesses on the trailing side in the direction of axial movement of the corresponding fork shaft having a length smaller than said predetermined length of the first side wall,
   the end piece of the selector rod having first and second pivot positions where it is engaged in the recesses of the first and second fork shafts, respectively and is movable together with the first or second fork shaft into a position effecting said forward or reverse speed, said end piece in said first or second pivot position being adapted to simultaneously engage the second side wall of the first or second fork shaft and the first side wall of the second or first fork shaft when erroneously moved in the opposite direction to the position effecting said forward or reverse speed, and
   means for preventing simultaneous axial movement of said first and second fork shafts or for preventing axial movement of the first and second fork shafts from their neutral positions in the opposite directions to those for selecting said forward and reverse speeds, respectively.

2. A gear shift mechanism as defined in claim 1, in which the arrangement is such that the end faces of the two side walls and the outer surface of the base wall of each said recess are aligned with one another to form two oppositely directed, interengaging L-shapes by said recesses and side walls.

3. A gear shift mechanism as defined in claim 1, in which said prevention means comprises an interlock mechanism which prevents the simultaneous movement of said two fork shafts.

4. A gear shift mechanism as defined in claim 1, in which said prevention means comprises a stop mechanism which prevents the displacement of one fork shaft from its neutral position in one direction.

5. A gear shift mechanism as defined in claim 4, in which said stop mechanism comprises a spherical ball, a spring biasing said ball into one of two grooves formed in the circumferential wall of any one of the fork shaft, said two grooves being interconnected by an axial peripheral groove shallower than the depth of the grooves, and an abutment member located above the ball and engageable with the ball with axial movement of the fork shaft, the distance of the abutment member from the ball being such that the engagement of the ball with the abutment member prevents the ball from riding upon the circumferential surface of the fork shaft while allowing the ball to ride upon the peripheral groove.

6. A gear shift mechanism as defined in claim 4, in which said stop mechanism comprises a snap ring fixed around each said fork shaft at a leading end in the direction of axial movement thereof and abuttable against a wall of a housing bore through which the fork shaft is passed.

* * * * *